United States Patent
Asano et al.

(10) Patent No.: US 10,920,825 B2
(45) Date of Patent: Feb. 16, 2021

(54) MOTION GUIDE DEVICE LOAD MEASURING SYSTEM AND LOAD MEASURING METHOD, AND MOTION GUIDE DEVICE SERVICE LIFE CALCULATING METHOD

(71) Applicant: THK CO., LTD., Tokyo (JP)

(72) Inventors: Yusuke Asano, Tokyo (JP); Tetsuhiro Nishide, Tokyo (JP); Takuya Horie, Tokyo (JP); Shinji Aoki, Tokyo (JP); Hiroyuki Takizawa, Tokyo (JP)

(73) Assignee: THK CO., LTD., Tokyo (JP)

( * ) Notice: Subject to any disclaimer, the term of this patent is extended or adjusted under 35 U.S.C. 154(b) by 345 days.

(21) Appl. No.: 16/066,114

(22) PCT Filed: Jan. 17, 2017

(86) PCT No.: PCT/JP2017/001336
§ 371 (c)(1),
(2) Date: Jun. 26, 2018

(87) PCT Pub. No.: WO2017/126489
PCT Pub. Date: Jul. 27, 2017

(65) Prior Publication Data
US 2020/0284297 A1    Sep. 10, 2020

(30) Foreign Application Priority Data
Jan. 22, 2016  (JP) .............................. JP2016-010548

(51) Int. Cl.
*F16C 29/06* (2006.01)
*F16C 41/02* (2006.01)

(52) U.S. Cl.
CPC .......... *F16C 29/0647* (2013.01); *F16C 41/02* (2013.01)

(58) Field of Classification Search
CPC ............................ F16C 29/0647; F16C 41/02
See application file for complete search history.

(56) References Cited

U.S. PATENT DOCUMENTS

| 5,473,992 A | * | 12/1995 | Takei | ..................... | B23Q 1/285 |
| | | | | | 104/290 |
| 5,713,136 A | * | 2/1998 | Takei | ..................... | G01B 3/008 |
| | | | | | 33/501.02 |

(Continued)

FOREIGN PATENT DOCUMENTS

| CN | 103174740 A | 6/2013 |
| CN | 103620242 A | 3/2014 |

(Continued)

OTHER PUBLICATIONS

ITO, JP2007032712A (Year: 2005).*
(Continued)

*Primary Examiner* — Mohammad K Islam
(74) *Attorney, Agent, or Firm* — Westerman, Hattori, Daniels & Adrian, LLP

(57) ABSTRACT

Provided is a motion guide device load measuring system that can accurately measure loads acting on a motion guide device in use. The load measuring system includes a position detecting unit (4) for detecting the position of a sliding member (12) relative to a track member (11) in a direction of relative movement, and at least one sensor (2a-2d, 3a-3d) for detecting the relative displacement of the sliding member (12) relative to the track member (11) in a radial direction and/or a horizontal direction. A calculating unit (6) calculates loads acting on the motion guide device (1), in association with the position of the sliding member (12), on the basis of position information detected by the position detecting unit (4) and displacement information detected by one or more of the sensors (2a-2d, 3a-3d).

10 Claims, 9 Drawing Sheets

(56) References Cited

U.S. PATENT DOCUMENTS

| | | | | |
|---|---|---|---|---|
| 5,950,773 | A * | 9/1999 | Ito | B23Q 1/28 188/28 |
| 6,155,716 | A * | 12/2000 | Okamura | B23Q 1/017 384/48 |
| 10,725,389 | B2 * | 7/2020 | Aoki | G03F 7/70816 |
| 2001/0051009 | A1 * | 12/2001 | Shimizu | F16C 29/008 384/45 |
| 2005/0222740 | A1 * | 10/2005 | Inoue | B60T 8/171 701/70 |
| 2005/0279588 | A1 * | 12/2005 | Fujita | B66B 7/044 187/393 |
| 2007/0237435 | A1 | 10/2007 | Nagao et al. | |
| 2009/0154849 | A1 * | 6/2009 | Mochizuki | F16C 29/0609 384/45 |
| 2014/0086520 | A1 | 3/2014 | Niwa | |
| 2015/0247782 | A1 * | 9/2015 | Sato | G01M 17/10 73/788 |
| 2016/0003295 | A1 * | 1/2016 | Mochizuki | F16C 29/0623 384/43 |
| 2018/0039191 | A1 * | 2/2018 | Shibazaki | G03F 9/00 |
| 2019/0193942 | A1 * | 6/2019 | Hayashi | G01D 5/24438 |
| 2020/0200217 | A1 * | 6/2020 | Takahashi | F16C 29/0609 |

FOREIGN PATENT DOCUMENTS

| | | |
|---|---|---|
| CN | 104619571 A | 5/2015 |
| JP | 5-288216 A | 11/1993 |
| JP | 2007-32712 A | 2/2007 |
| JP | 2007-263286 A | 10/2007 |
| JP | 2008-128639 A | 6/2008 |
| JP | 2015-218888 A | 12/2015 |
| JP | 2015-224728 A | 12/2015 |

OTHER PUBLICATIONS

Office Action dated Dec. 31, 2019, issued in counterpart TW Application No. 106102104 (7 pages).
Office Action dated Oct. 31, 2019, issued in counterpart CN Application No. 201780007361.0, with English translation (12 pages).
International Search Report dated Feb. 28, 2017, issued in counterpart application No. PCT/JP2017/001336. (2 pages).

\* cited by examiner

ENLARGED VIEW OF PART B

MOTION GUIDE DEVICE LOAD MEASURING SYSTEM AND LOAD MEASURING METHOD, AND MOTION GUIDE DEVICE SERVICE LIFE CALCULATING METHOD

TECHNICAL FIELD

The present invention relates to a load measuring system for a motion guide device to measure a load acting on the motion guide device, and a load measuring method. The present invention also relates to a method of calculating a service life of the motion guide device.

BACKGROUND ART

A motion guide device includes a track member, and a sliding member that is assembled on the track member via rolling bodies such that the sliding member can move relative to the track member. As the sliding member moves relative to the track member, the rolling bodies that are disposed between the sliding member and the track member undergo the rolling motion. By taking advantage of the rolling motion of the rolling bodies, it is possible to cause the sliding member to smoothly move relative to the track member.

The motion guide device is assembled into a real machine such as a robot, a machine tool, a semiconductor manufacturing machine or a liquid crystal manufacturing machine, and guides a linear motion of a movable portion. When the motion guide device is in use, a load (it may be referred to as an actual load) acts on the motion guide device. This load considerably varies with the operating conditions of the motion guide device, e.g., the mass of the movable portion, a magnitude and a direction of an external force acting on the movable portion, and a magnitude of acceleration/deceleration of the movable portion. In addition to the above-mentioned operating conditions, the load may vary with other operating conditions such as a thermal strain of the real machine and an unbalanced load acting on the motion guide device. In particular, it is difficult to predict the latter operating conditions, and it is difficult to precisely predict the load on the motion guide device. Conventionally, therefore, the motion guide device is selected in this manner; the load calculated from the former operating conditions is multiplied by a safety factor, and then a motion guide device that has a rated load (rated capacity) with a margin to the load multiplied by the safety factor is selected.

Instead of predicting the load on the motion guide device from the operating conditions, there are proposals to measure the load on the motion guide device in use. Such proposals include a method of measuring the load acting on the sliding member with a strain gauge being interposed between, for example, the sliding member and a table of the movable portion, and a method of calculating the load acting on the sliding member with strain gauges being attached to a pair of sleeves of the sliding member respectively and a graph that represents the relationship between an amount of strain and a load (see Patent Literature Document 1).

LISTING OF REFERENCES

Patent Literature Documents

PATENT LITERATURE DOCUMENT 1: Japanese Patent Application Laid-Open Publication No. 2007-263286

SUMMARY OF THE INVENTION

Problems to be Solved by the Invention

In the former load measuring method, however, the center of gravity of the movable portion shifts to a higher position because the strain gauge is interposed between the sliding member and the table of the movable portion or the like. Thus, a moment acting on the sliding member during acceleration and deceleration becomes greater than when the motion guide device is in use without the strain gauge. Consequently, there is a problem that it is not possible to accurately measure the load on the motion guide device in use.

In the latter load measuring method, a pair of sleeves of the sliding member always deform to open even when a load in the radial direction, a load in the horizontal direction or a moment acts on the sliding member. Thus, it is difficult to judge in which direction the load acts from the output of the strain gauge. There is another problem that it is necessary to prepare a graph that represents the relationship between an amount of strain and a load every time when the size of the motion guide device changes.

In view of the foregoing, an object of the present invention is to provide a load measuring system for a motion guide device, which can accurately measure the load acting on the motion guide device in use, a load measuring method, and a method of calculating a service life of the motion guide device.

Solution to the Problems

In order to solve the above-mentioned problems, one aspect of the present invention is a load measuring system for a motion guide device, the motion guide device having a sliding member that is assembled on a track member via rolling bodies such that the sliding member can move relative to the track member, the load measuring system including: a position detecting unit configured to detect a position of the sliding member relative to the track member in a relative movement direction; at least one sensor configured to detect a displacement of the sliding member relative to the track member in a radial direction and/or a horizontal direction; and a calculating unit configured to calculate a load acting on the motion guide device associated with the position, based on position information detected by the position detecting unit and displacement information detected by the above-mentioned at least one sensor.

Another aspect of the present invention is a method of measuring a load on a motion guide device that has a sliding member assembled on a track member via rolling bodies such that the sliding member can move relative to the track member, the method including the step of detecting a position of the sliding member relative to the track member in a relative movement direction, the step of detecting a displacement of the sliding member relative to the track member in a radial direction and/or a horizontal direction, and the step of calculating the load on the motion guide device associated with the position, based on detected position information and detected displacement information.

Still another aspect of the present invention is a method of calculating a service life of a motion guide device, the method including: calculating an average load on the motion guide device in an action pattern of a real machine, based on the load on the motion guide device, which is calculated by using the above-described method of measuring a load; and calculating a service life of the motion guide device, based on the average load.

Advantageous Effects of the Invention

In the present invention, the load acting on the sliding member is not directly detected. Rather, the displacement of the sliding member relative to the track member in the radial direction and/or the horizontal direction is detected, and the load on the motion guide device is calculated on the basis of the detected displacement. In the present invention, it is not necessary to clamp a strain gauge between the sliding member and a table of a movable portion or another part, and it is possible to accurately measure the load on the motion guide device while the real machine is being used. Furthermore, in the present invention, the load on the motion guide device is associated with the position of the sliding member relative to the track member in the relative movement direction. Therefore, it is possible to accurately measure the load on the motion guide device that changes during traveling.

MODE FOR CARRYING OUT THE INVENTION

A load measuring system for a motion guide device according to one embodiment of the present invention will now be described in detail with reference to the accompanying drawings. It should be noted, however, that the load measuring system for the motion guide device of the present invention can be embodied in various forms and modes, and is not limited to the embodiment described in the description. The embodiment is provided here with an intention that a skilled person sufficiently understands the scope of the invention with a sufficient disclosure in the description.

Figure 1:
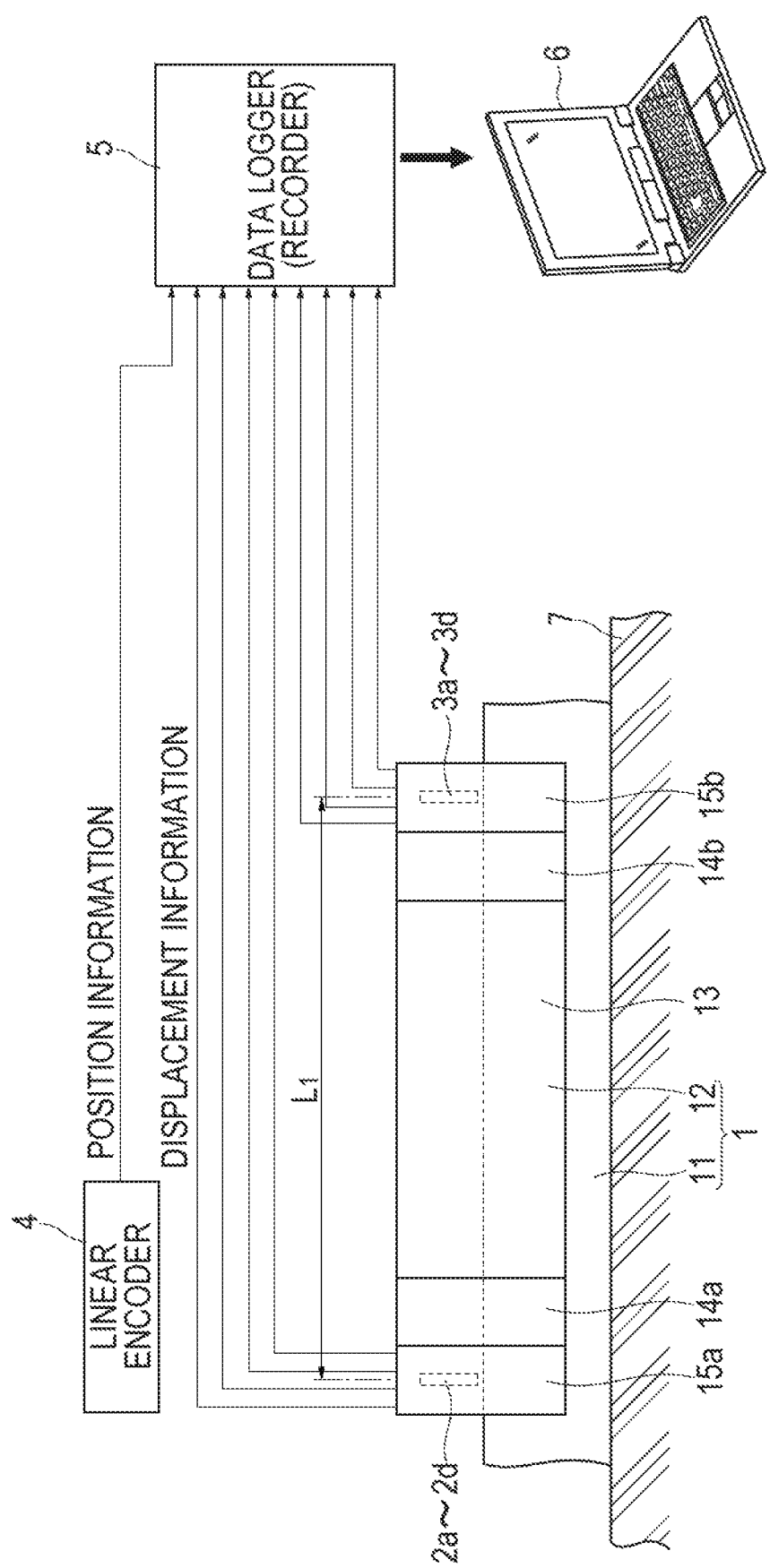
FIG. 1 is an overall view of a load measuring system for a motion guide device according to one embodiment of the present invention.

FIG. 1 illustrates an overall view of the load measuring system for the motion guide device according to this embodiment. 1 denotes the motion guide device, 2a-2d and 3a-3d denote sensors, 4 denotes a linear encoder, which serves as a position detecting unit, 5 denotes a data logger, which serves as a recorder, and 6 denotes a computer, which serves as a calculating unit.

Configuration of the Motion Guide Device

Firstly, the configuration of the motion guide device 1 will be described. The motion guide device 1 includes a rail 11 that serves as a track member, and a carriage 12 that serves as a sliding member and is assembled on the rail 11 such that the carriage can move in the lengthwise direction of the rail 11. In this embodiment, the rail 11 is mounted on a base 7 of a real machine, and a table 8 (see FIG. 8) of the real machine is mounted on the carriage 12. The real machine is, for example, a robot, a machine tool, a semiconductor manufacturing machine or a liquid crystal manufacturing machine. The linear motion of a movable body, including the table 8, is guided by the motion guide device 1. It should be noted that the motion guide device 1 may be turned upside down such that the carriage 12 is mounted on the base 7 and the rail 11 is mounted on the table 8. Further, the movable body is placed on the carriage 12 and secured on the carriage 12 such that the movable body moves together with the carriage 12. The type of the movable body is not limited to a particular type. The table 8 may not be included in the movable body.

Figure 2:
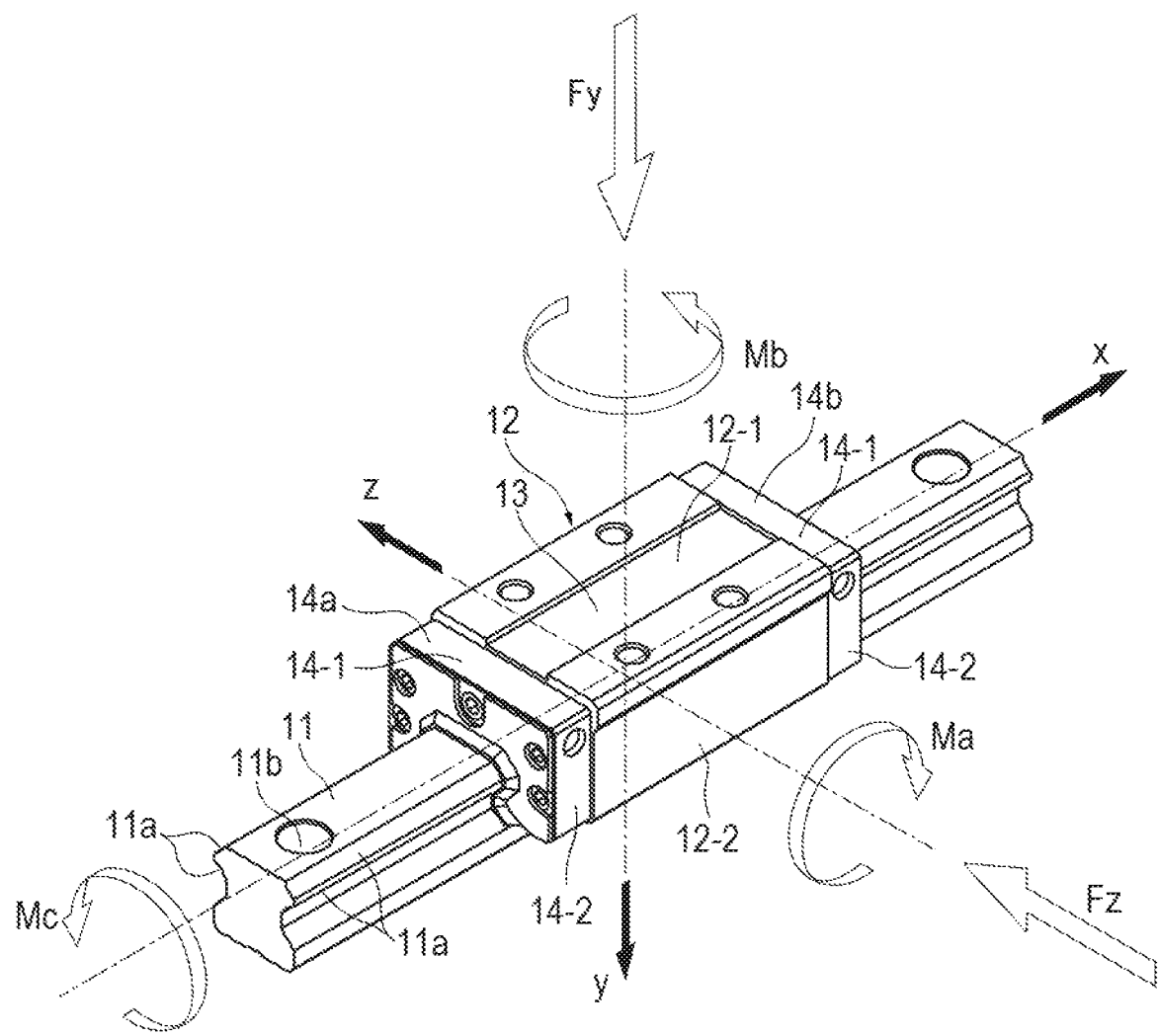
FIG. 2 is a perspective view of an outside appearance of the motion guide device of the embodiment.

FIG. 2 illustrates a perspective view of an outer appearance of the motion guide device 1. For the sake of description, the rail 11 is disposed on the horizontal plane, the direction viewed from the lengthwise direction (longitudinal direction) of the rail 11, i.e., the x-axis shown in FIG. 2, is referred to as the front-rear direction, the y-axis is referred to as the up-down direction, and the z-axis is referred to as the right-left direction when the configuration of the motion guide device 1 is described. It should be noted that the arrangement of the motion guide device 1 is not limited to the above-described arrangement.

On each of the right and left sides of the rail 11, there are provided two raceway surfaces 11a, i.e., the upper and lower raceway surfaces, as rolling bodies rolling portions. The cross-section of the raceway surface 11a has a circular arc shape. Through holes 11b are provided in the upper surface of the rail 11 at constant intervals in the lengthwise direction such that fastening members for fastening the rail 11 to the base 7 pass through the through holes 11b.

The carriage 12 includes a horizontal portion 12-1 that faces the upper surface of the rail 11, and a pair of sleeves 12-2 that face the side surfaces of the rail 11. The cross-section of the carriage 12 has a "turned U" shape. The carriage 12 includes a carriage main body 13, which is located at the center in the moving direction, a pair of lid members 14a and 14b disposed on opposite ends of the carriage main body 13 in the moving direction, and a pair of sensor mounts 15a and 15b (see FIG. 1) disposed at the outermost ends of the lid members 14a and 14b in the moving direction. Each of the lid members 14a and 14b includes a horizontal portion 14-1 that faces the upper surface of the rail 11, and a pair of sleeves 14-2 that face the side surfaces of the rail 11. The cross-section of each of the lid members 14a and 14b has a "turned U" shape. Similarly, each of the sensor mounts 15a and 15b includes a horizontal portion 15-1 that faces the upper surface of the rail 11, and a pair of sleeves 15-2 that face the side surfaces of the rail 11. The cross-section of each of the sensor mounts 15a and 15b has a "turned U" shape (see FIG. 4A). The lid members 14a and 14b are tightened to the carriage main body 13 by fastening members such as bolts. The sensor mounts 15a and 15b are tightened to the carriage main body 13 and/or the lid members 14a and 14b by fastening members such as bolts. It should be noted that the sensor mounts 15a and 15b are omitted in FIGS. 2 and 3.

Figure 3:
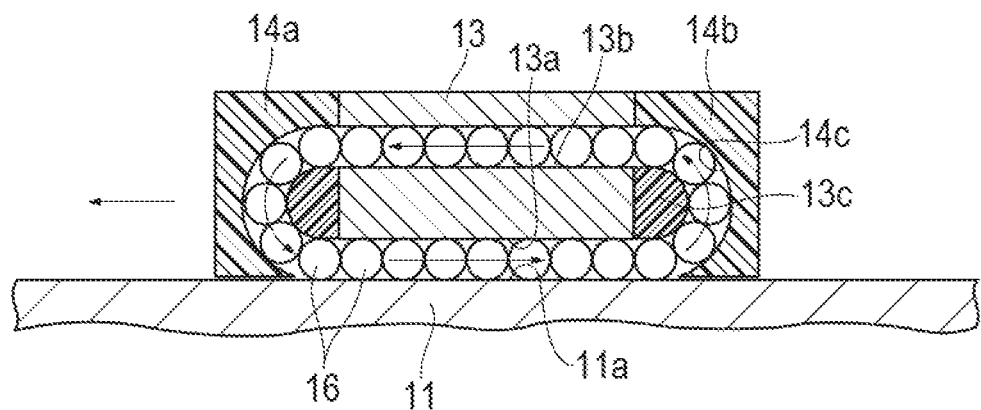
FIG. 3 is a horizontal cross-sectional view of the motion guide device of the embodiment.

As illustrated in FIG. 3, which is the horizontal cross-sectional view of the motion guide device 1, the carriage main body 13 has four raceway surfaces 13a that face the four raceway surfaces 11a of the rail 11. The carriage main body 13 has return paths 13b that extend in parallel to the respective raceway surfaces 13a as rolling bodies return paths. Each of the lid members 14a and 14b has a U-shaped direction-changing path 14c that connects the corresponding raceway surface 13a to the corresponding return path 13b. The inner circumstance of the direction-changing path 14c is defined by an inner circumstance 13c that has a semicircular cross-section and is integral with the carriage main body 13. A track-like circulation path is formed by a load rolling path between the raceway surface 11a of the rail 11 and the raceway surface 13a of the carriage main body 13, a pair of direction-changing paths 14c and the return path 13b. Balls 16, which are the rolling bodies, are received in the circulation path. As the carriage 12 moves relative to the rail 11, the balls 16 between the carriage 12 and the rail 11 roll along the load rolling path. The ball 16 that rolls to one end of the load rolling path enters one of the direction-changing paths 14c, travels through the return path 13b and the other direction-changing path 14c, and returns to the other end of the load rolling path.

Configuration of the Sensor

Figure 4A:
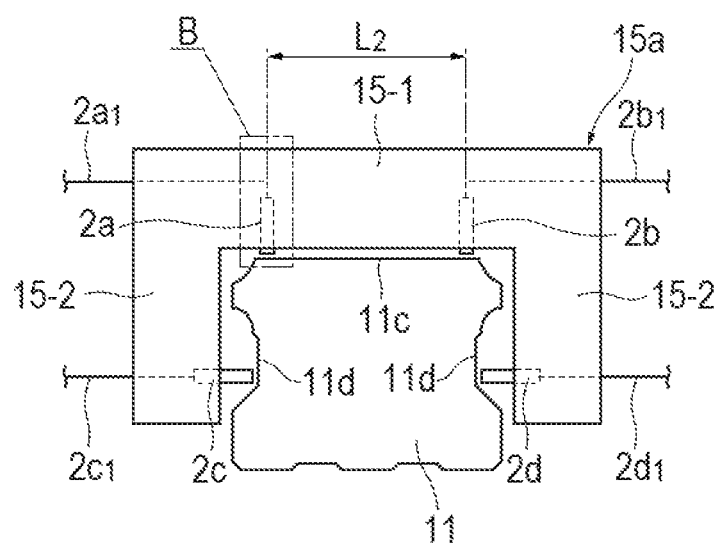
FIG. 4A is a front view of the motion guide device when viewed from a lengthwise direction of a rail.
Figure 4B:
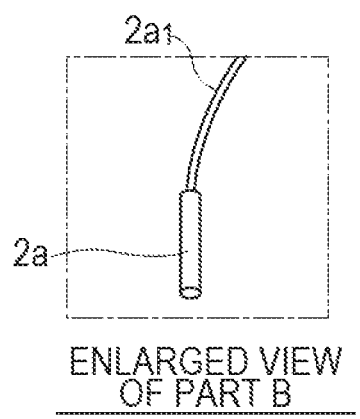
FIG. 4B is an enlarged view of the part B.

As shown in FIG. 1, the sensors 2a-2d and 3a-3d are, for example, electrostatic capacitance type displacement gauges and detect the displacement of the carriage 12 relative to the rail 11 in a contactless manner (see FIG. 4B that shows the enlarged view). As described above, a pair of sensor mounts 15a and 15b are attached to the opposite ends of the carriage 12 in the moving direction. The four sensors 2a-2d are mounted on one of the sensor mounts, i.e., the sensor mount 15a. The four sensors 2a-2d are disposed at the same position in the lengthwise direction of the rail 11. Similarly, the four sensors 3a-3d are mounted on the other sensor mount 15b. The four sensors 3a-3d are disposed at the same position in the lengthwise direction of the rail 11. The distance between the sensors 2a-2d and the sensors 3a-3d in the lengthwise direction of the rail 11 is denoted by $L_1$. It should be noted that the four sensors 2a-2d may be disposed at different positions in the lengthwise direction of the rail 11, and the four sensors 3a-3d may be disposed at different positions in the lengthwise direction of the rail 11.

FIGS. 4A and 4B show the sensor mount 15a when viewed in the lengthwise direction of the rail 11. As described above, the sensor mount 15a has the horizontal portion 15-1 that faces the upper surface 11c of the rail 11 and the pair of sleeves 15-2 that face the right and left side surfaces of the rail 11. The two radial sensors 2a and 2b are disposed on the horizontal portion 15-1 to detect the displacement in the radial direction. The radial sensors 2a and 2b face the upper surface 11c of the rail 11 with a gap to detect the gap between the sensors and the upper surface 11c of the rail 11. The distance between the two radial sensors 2a and 2b in the right-left direction is denoted by L2.

The two horizontal sensors 2c and 2d are disposed on the pair of sleeves 15-2 to detect the displacement in the horizontal direction. The horizontal sensors 2c and 2d face the side surfaces 11d of the rail 11 with a gap to detect the gap between the sensors and the side surfaces 11d.

Assuming that the rail 11 is disposed on the horizontal plane, the radial sensors 2a and 2b and the horizontal sensors 2c and 2d are located below the upper surface (mounting surface) of the carriage 12. This is because the table 8 is disposed on the upper surface (mounting surface) of the carriage 12. Cables $2a_1$-$2d_1$ of the sensors 2a-2d extend outward to the right and left from the sleeves 15-2 of the sensor mount 15a. It should be noted that the cables $2a_1$-$2d_1$ may extend forward from the front face of the sensor mount 15a (in a direction perpendicular to the drawing sheet). It should also be noted that the height of the upper surface of the sensor mount 15a may be lower than the upper surface (mounting surface) of the carriage 12, and the gap between the upper surface of the sensor mount 15a and the table 8 may be used as a gap that allow the cables $2a_1$ and $2b_1$ to extend outward therethrough.

Similar to the sensor mount 15a, the sensor mount 15b shown in FIG. 1 has the horizontal portion 15-1 and the pair of sleeves 15-2. The two radial sensors 3a and 3b are disposed on the horizontal portion 15-1. The two horizontal sensors 3c and 3d are disposed on the pair of sleeves 15-2.

Configuration of the Linear Encoder

The linear encoder 4 detects the position of the carriage 12 in the x-axis direction. For example, the linear encoder 4 has a scale attached to the base 7 of the real machine or the rail 11, and a head attached to the table 8 of the real machine or the carriage 12 to read the scale. It should be noted that if the rail 11 is configured to move, the linear encoder 4 detects the position of the rail 11 in the x-axis direction. In this specification, the expression "to detect the position of the sliding member relative to the track member in the relative movement direction" includes detecting the position of the rail 11 in the x-axis direction as described above. Also, the position detecting unit is not limited to the linear encoder. For example, if the table of the real machine is driven by a ball-screw drive mechanism, the position detecting unit may be a rotary encoder that detects the angle of a motor configured to drive the ball-screw drive mechanism.

Configuration of the Data Logger and the Computer

Displacement information of the carriage 12 detected by the sensors 2a-2d and 3a-3d is recorded in the data logger 5, which is the recording device, at predetermined sampling periods. Position information of the carriage 12 detected by the linear encoder 4 is also recorded in the data logger 5 at predetermined sampling periods. The data logger 5 sends the recorded displacement information and the recorded position information to the computer 6 by a wire communication unit or by a wireless communication unit. The data logger 5 is disposed in the vicinity of the real machine. The computer 6 is disposed in the vicinity of the real machine or at a remote place.

The sensors 2a-2d and 3a-3d detect the position of the carriage 12 relative to the rail 11 in a no-load condition, in which the movable portion of the real machine is removed from the carriage 12, as a reference for the displacement while the carriage 12 is moving. Also, the sensors 2a-2d and 3a-3d detect the position of the carriage 12 relative to the rail 11 in a loaded condition, in which the moving portion of the real machine is attached to the carriage 12, while the carriage 12 is moving. The difference between the position of the carriage 12 in the loaded condition and the position of the carriage 12 in the no-load condition is the displacement. The sensors 2a-2d and 3a-3d detect the positions of the carriage 12 in the no-load condition and the loaded condition as displacement information, and send the displacement information to the data logger 5.

The computer 6 calculates the difference (displacement) in the position of the carriage 12 between the no-load condition and the loaded condition, which are detected by the sensors 2a-2d and 3a-3d. Then, the computer 6 calculates the load acting on the motion guide device 1 (carriage 12) on the basis of the displacement of the carriage 12. When calculating the load, the computer 6 firstly calculates five components of displacement of the carriage 12 on the basis of the displacement. Subsequently, the computer 6 calculates the load acting on each of the balls 16 and its contact angle on the basis of the five components of the displacement. Then, the computer 6 calculates the loads acting on the carriage 12 (five components of an external force) on the basis of the loads and contact angles of the respective balls 16. The above-mentioned three processes executed by the computer will be described below in detail.

Calculating Five Components of Displacement of the Carriage

As shown in FIG. 2, the x-y-z coordinate axes are set on the motion guide device 1. Then, the loads acting on the origin of the x-y-z coordinate axes are a sum $F_y$ of a radial load and an inverse radial load, and a sum $F_z$ of horizontal loads. The load acting in the positive direction in the y-axis in FIG. 2, i.e., in the direction that presses the carriage 12 onto the rail 11, is the radial load. The load acting in the opposite direction, i.e., in the direction that removes the carriage 12 from the rail 11, is the inverse radial load. The loads acting in the negative and positive directions of the z-axis in FIG. 2, i.e., in the direction that laterally (transversely) shift the carriage 12 from the rail 11 are the horizontal loads.

The moments around the x-y-z coordinate axes are a sum $M_a$ of pitching moments, a sum $M_b$ of yawing moments, and a sum $M_c$ of rolling moments. The radial load $F_y$, the pitching moment $M_a$, the rolling moment $M_c$, the horizontal load $F_z$ and the yawing moment $M_b$ act, as the external forces, on the carriage 12. As these five components of the external force act on the carriage 12, they generate corresponding five components of the displacement to the carriage 12, i.e., a radial displacement $\alpha_1$(mm), a pitching angle $\alpha_2$(rad), a rolling angle $\alpha_3$(rad), a horizontal displacement $\alpha_4$(mm) and a yawing angle $\alpha_5$(rad).

Figure 5:
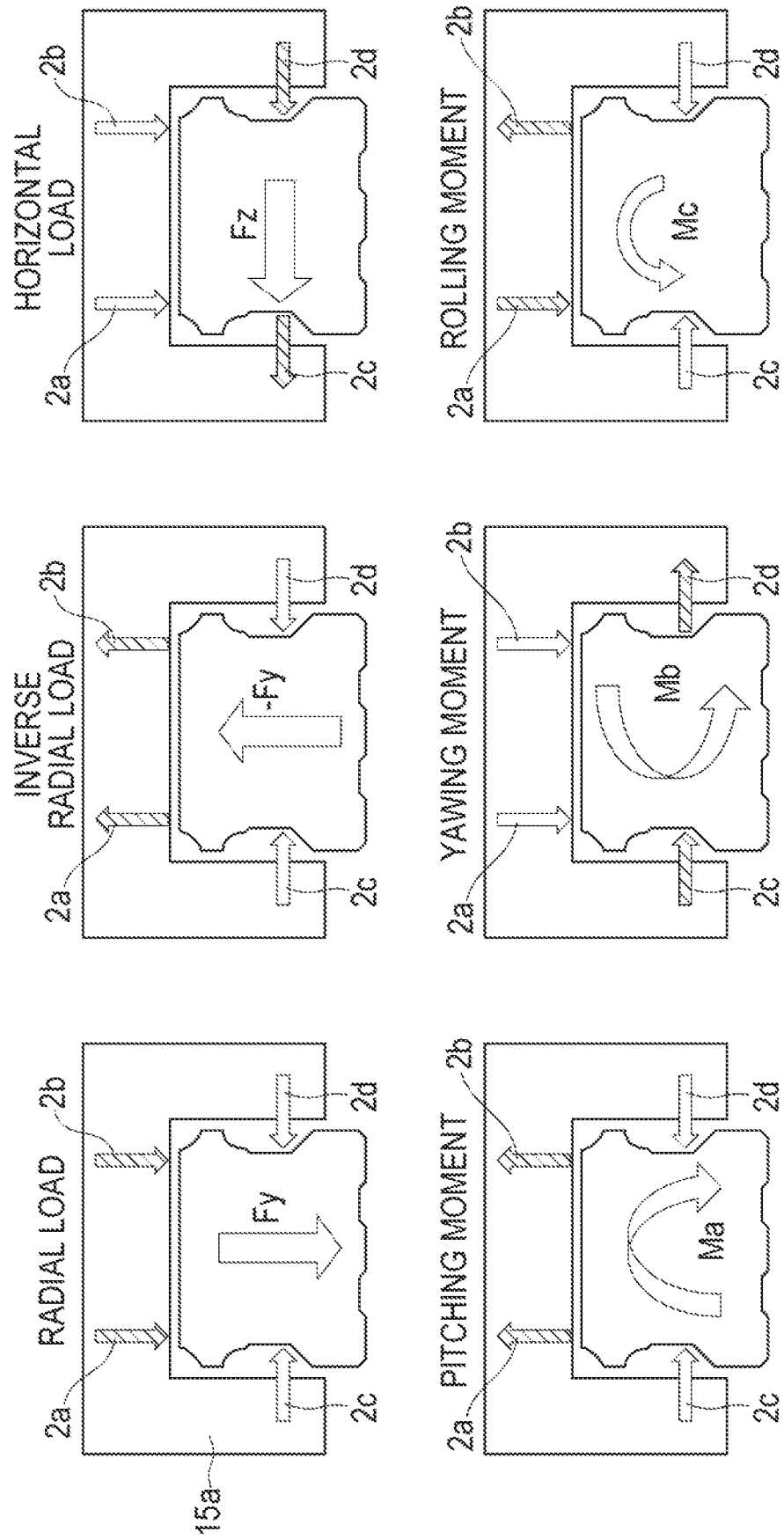
FIG. 5 is a set of views to show changes in the sensor output when an external force acts on a carriage.

FIG. 5 illustrates the changes in the outputs from the sensors 2a-2d when the external forces act on the carriage 12. In FIG. 5, the shaded arrows indicate those sensors whose outputs change, and the white arrows indicate those sensors whose outputs do not change. When the radial load $F_y$ acts on the carriage 12, the gap between the carriage 12 and the rail 11 in the up-down direction becomes smaller. On the other hand, when the inverse radial load $-F_y$ acts on the carriage 12, the gap between the carriage 12 and the rail 11 in the up-down direction becomes greater. The radial sensors 2a and 2b detect the changes in the gap (displacements) in the up-down direction. It should be noted that the radial sensors 3a and 3b, which are attached to the sensor mount 15b (see FIG. 1), also detect the displacement in the up-down direction.

When the radial load $F_y$ or the inverse radial load $-F_y$ acts on the carriage 12, the radial displacement $\alpha_1$ of the carriage 12 is given, for example, by the following equation where the displacements detected by the radial sensors 2a and 2b are $A_1$ and $A_2$, and the displacements detected by the radial sensors 3a and 3b are $A_3$ and $A_4$.

$$\alpha_1 = (A_1 + A_2 + A_3 + A_4)/4 \qquad \text{Equation 1:}$$

As the horizontal load $F_z$ acts on the carriage 12, the carriage 12 shifts from the rail 11 laterally, and the gap between one of the sleeves 12-2 of the carriage 12 and the rail 11 in the horizontal direction becomes smaller whereas the gap between the other sleeve 12-2 of the carriage 12 and the rail 11 in the horizontal direction becomes greater. The horizontal sensors 2c and 2d detect such changes in the gap (displacements) in the horizontal direction. It should be noted that the horizontal sensors 3c and 3d, which are attached to the sensor mount 15b (see FIG. 1), also detect the displacements in the horizontal direction. The horizontal displacement $\alpha_4$ of the carriage 12 is given, for example, by the following equation where the displacements detected by the horizontal sensors 2c and 2d are $B_1$ and $B_2$, and the displacements detected by the horizontal sensors 3c and 3d are $B_3$ and $B_4$.

$$\alpha_4 = (B_1 - B_2 + B_3 - B_4)/4 \qquad \text{Equation 2:}$$

As the pitching moment $M_a$ acts on the carriage 12, the gap between the radial sensors 2a and 2b and the rail 11 becomes greater whereas the gap between the radial sensors 3a and 3b and the rail 11 becomes smaller. If the pitching angle $\alpha_2$ is sufficiently small, the pitching angle $\alpha_2$(rad) is given, for example, by the following equation.

$$\alpha_2 = ((A_3 + A_4)/2 - (A_1 + A_2)/2)/L_1 \qquad \text{Equation 3:}$$

As the rolling moment $M_c$ acts on the carriage 12, the gap between the radial sensors 2a and 3a and the rail 11 becomes smaller whereas the gap between the radial sensors 2b and 3b and the rail 11 becomes greater. If the rolling angle $\alpha_3$ is sufficiently small, the rolling angle $\alpha_3$(rad) is given, for example, by the following equation.

$$\alpha_3 = ((A_1 + A_3)/2 - (A_2 + A_4)/2)/L_2 \qquad \text{Equation 4:}$$

As the yawing moment $M_b$ acts on the carriage 12, the gap between the horizontal sensors 2c and 3d and the rail 11 becomes smaller whereas the gap between the horizontal sensors 2d and 3c and the rail 11 becomes greater. If the yawing angle $\alpha_5$ is sufficiently small, the yawing angle $\alpha_5$(rad) is given, for example, by the following equation.

$$\alpha_5 = ((A_1 + A_4)/2 - (A_2 + A_3)/2)/L_2 \qquad \text{Equation 5:}$$

In the above-described manner, the five components of the displacement of the carriage 12 can be calculated on the basis of the displacements detected by the sensors 2a-2d and 3a-3d.

Calculating the Load Acting on Each Ball and the Contact Angle

Figure 6:
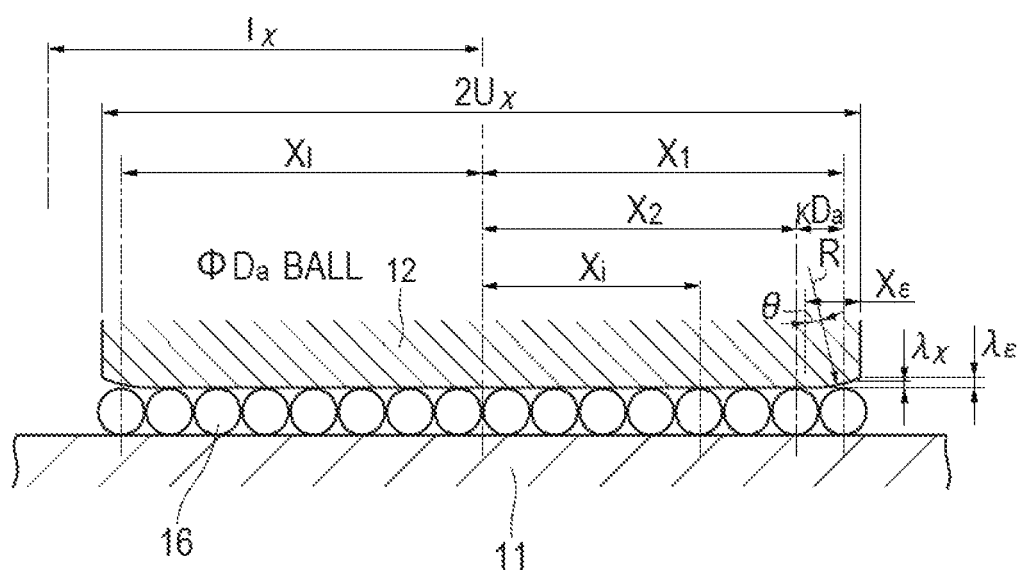
FIG. 6 is a cross-sectional view of portion of the carriage in the x-axis direction where balls are in contact.

FIG. 6 is a cross-sectional view taken in the x-axis direction, and shows part of the carriage 12 where the balls 16 inside the carriage 12 are in contact. As shown in FIG. 6, the pitch between each two adjacent balls is denoted by κDa, where κ0 has a value slightly greater than one, and the x-coordinate of each of the balls is defined as $x_i$. The length of that part of the carriage 12 in which the balls 16 roll is denoted by $2U_x$. The number of the balls in the length $2U_x$ is referred to as an effective number of balls, and designated by I. At both ends of the carriage 12, R-shaped large curved surfaces whose radius is R and depth is $\lambda_\varepsilon$ are made by processing that is called crowning.

When the five components of the external force act on the carriage 12, i.e., when the radial load $F_y$, the pitching moment $M_a$, the rolling moment $M_c$, the horizontal load $F_z$ and the yawing moment $M_b$ act on the carriage 12, we assume that the five components of the displacement are generated in the carriage 12, i.e., the radial displacement $\alpha_1$, the pitching angle $\alpha_2$, the rolling angle $\alpha_3$, the horizontal displacement $\alpha_4$, and the yawing angle $\alpha_5$ are generated in the carriage 12, and establish a theoretical formula.

Figure 7:
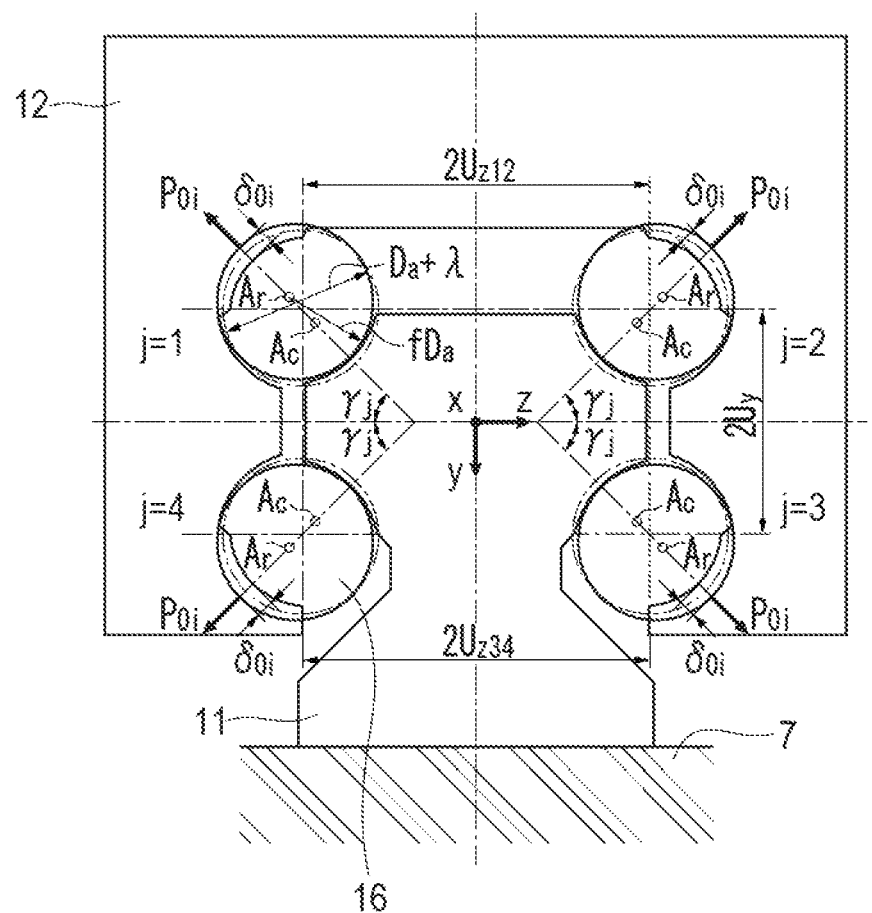
FIG. 7 is a cross-sectional view of the carriage to illustrate an inner load before five components of the displacement are generated.
Figure 8:
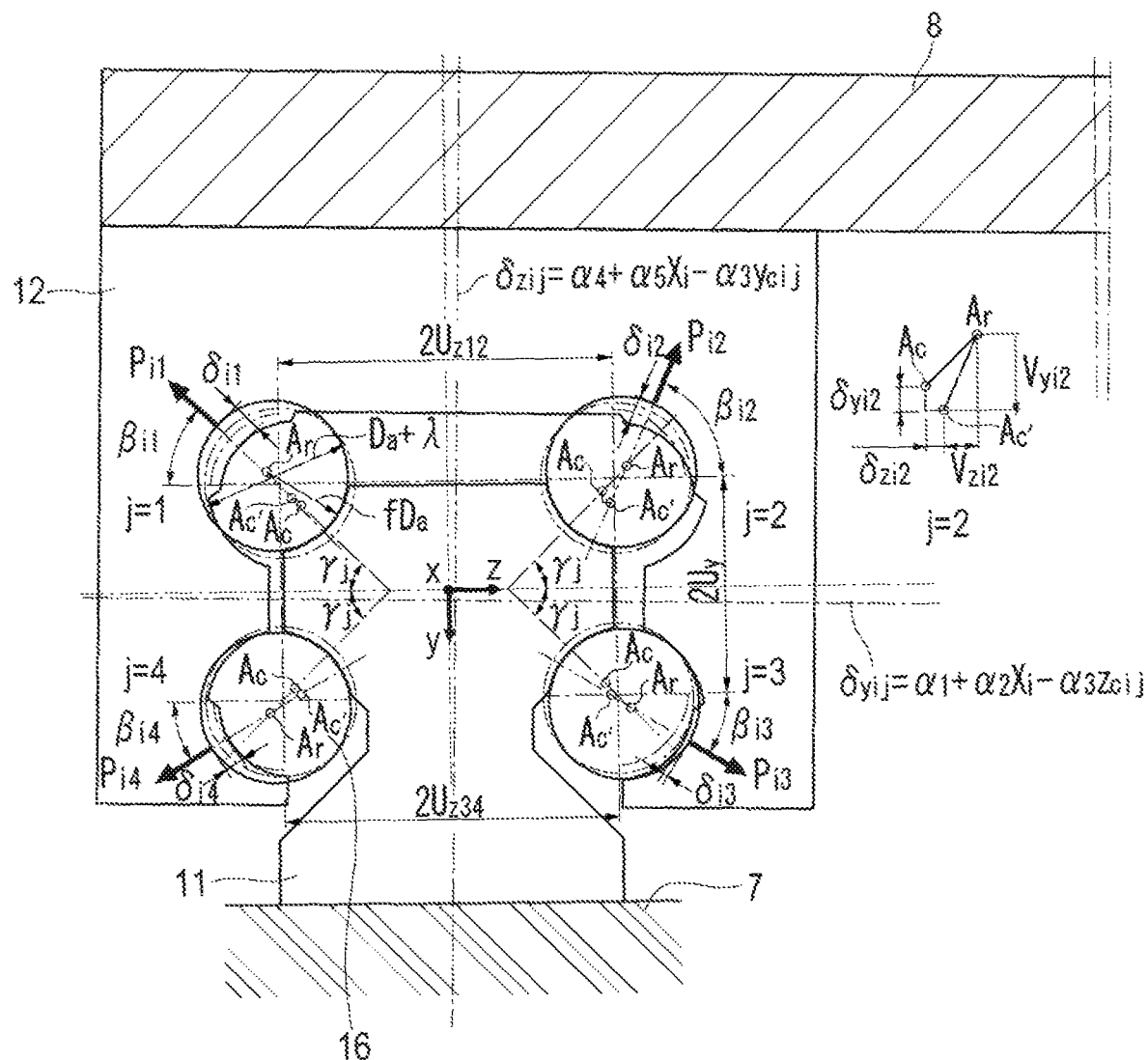
FIG. 8 is a cross-sectional view of the carriage to illustrate the inner load after the five components of the displacement are generated.

FIG. 7 illustrates the cross-sectional view to show the interior of the carriage 12 at the ball number i and the inner loads before the five components of the displacement are generated, and FIG. 8 illustrates the same interior and the inner loads after the five components of the displacement are generated. Here, the ball row number in the carriage 12 is denoted by j, and the ball number in the ball row is denoted by i. The ball diameter is denoted by $D_a$, and the goodness-of-fit between the ball 16 and the raceway surface of the rail 11 and that between the ball 16 and the raceway surface of the carriage 12 are both denoted by f. Thus, the radius of curvature of the raceway surface is denoted by $fD_a$. The center position of the curvature of the raceway surface of the rail is denoted by $A_r$, and the center position of the curvature of the raceway surface of the carriage is denoted by $A_c$. The angle defined by a line connecting these two center positions and the z-axis is the contact angle, and the initial value of the contact angle is denoted by $\gamma$. The distances between centers of each two adjacent balls are denoted by $2U_{z12}$, $2U_{z34}$ and $2U_y$.

A preload acts on the balls 16. Firstly, the principles of the preload will be described. The dimensions of that part which is defined between the raceway surface of the rail 11 and the corresponding (facing) raceway surface of the carriage 12 are decided by the dimensions of the rail 11 and the carriage 12 at the time of design and the geometry of the raceway surfaces. The diameter of the ball to be received therein is the ball diameter at the time of design. If the ball 16 that has a dimension of $D_a+\lambda$, i.e., a dimension slightly larger than the ball diameter at the time of design, is received therein, then the contact portion between the ball 16 and the raceway surface undergoes the elastic deformation due to the contact theory of Hertz, thereby forming the contact surface and generating the contact stress. The load generated in this manner is the inner load, i.e., the preload.

In FIG. 7, this load is denoted by $P_0$, and an amount of approaching between the rail 11 and the carriage 12 due to the elastic deformation of the contact portion is denoted by $\delta_0$. In reality, each of the balls is situated at the center position between the raceway surface of the rail 11 and the raceway surface of the carriage 12, as indicated by the single-dot chain line in FIG. 7, but various characteristic values derived from the contact theory of Hertz, which are generated at the two contact portions of the ball 16, are the same because the goodness-of-fit f between the raceway surface of the rail 11 and the ball 16 is equal to that of the carriage 12. Therefore, each of the balls 16 is illustrated at a position shifted onto the raceway surface of the rail 11 such that the amount $\delta_0$ of approaching between the raceway surface of the rail 11 and the raceway surface of the carriage 12 becomes easy to understand.

Normally, the preload is defined as a total of radial loads that act on the upper two rows of the track (or the lower two rows of the track) per one carriage, and therefore the preload $P_{pre}$ is represented by the following equation.

$$P_{pre} = 2\sum_{i=1}^{I}\sum_{j=1}^{2} P_{0i}\sin\gamma_j \quad \text{Equation 6}$$

The following passages will describe a situation in which the five components of the external force act on the motion guide device 1 from this condition and the five components of the displacement are generated. As depicted in FIG. 8, the center of the motion guide device 1 at the origin of the coordinates shifts due to the five components of the displacement, i.e., the radial displacement $\alpha_1$, the pitching angle $\alpha_2$, the rolling angle $\alpha_3$, the horizontal displacement $\alpha_4$, and the yawing angle $\alpha_5$, and therefore the relative displacement takes place between the rail 11 and the carriage 12 at the position of the ball i.

In this situation, the center of curvature of the raceway surface of the rail does not move (shift), but the carriage 12 moves. Thus, the center of curvature of the raceway surface of the carriage geometrically moves at every ball position. This movement is represented by the illustration in which the center $A_c$ of curvature of the raceway surface of the carriage moves to $A_c'$. An amount of movement from $A_c$ to $A_c'$ is divided into the y-direction and z-direction. The amount of movement in the y-direction is denoted by $\delta_y$, and the amount of movement in the z-direction is denoted by $\delta_z$. In the following description, the subscript i indicates the ball and the subscript j indicates the row of the balls. Then, $\delta_y$ and $\delta_z$ are represented as follows.

$$\delta_{yij} = \alpha_1 + \alpha_2 x_i + \alpha_3 z_{cij}$$

$$\delta_{zij} = \alpha_4 + \alpha_5 x_i - \alpha_3 u_{cij} \quad \text{Equation 7:}$$

where $z_c$ and $y_c$ are the coordinates of the point $A_c$.

Because the line connecting the center of curvature of the raceway surface of the rail 11 to that of the carriage 12 defines the contact angle that indicates the direction of the normal line of the ball load, the initial contact angle $\gamma_j$ changes to $\beta_{ij}$, and the distance between the center of curvature of the raceway surface of the rail 11 and that of the carriage 12 changes from the initial distance between $A_r$ and $A_c$ to the distance between $A_r$ and $A_c'$. This change in the distance between the center of curvature of the raceway surface of the rail 11 and that of the carriage 12 defines the elastic deformation of the ball 16 at the two contact portions. As described in connection with FIG. 7, the ball 16 is illustrated at a position shifted to the raceway surface of the rail to obtain the amount of elastic deformation of the ball 16.

The distance between $A_r$ and $A_c'$ is also divided into the y-direction and the z-direction. The distance in the y-direction is denoted by $V_y$ and the distance in the z-direction is denoted by $V_z$. The following equations are obtained if $\delta_{yij}$ and $\delta_{zij}$ are used.

$$V_{yij} = (2f-1)D_a \sin\gamma_j + \delta_{yij}$$

$$V_{zij} = (2f-1)D_a \cos\gamma_j + \delta_{zij} \quad \text{Equation 8:}$$

Thus, the distance between $A_r$ and $A_c'$ is given by the following equation.

$$\overline{A_r A_c'} = (V_{yij}^2 + V_{zij}^2)^{\frac{1}{2}} \quad \text{Equation 9}$$

The contact angle $\beta_{ij}$ is given by the following equation.

$$\tan\beta_{ij} = \frac{V_{yij}}{V_{zij}} \quad \text{Equation 10}$$

From the foregoing, the amount $\delta_{ij}$ of elastic deformation of the ball 16 is given by the following equation.

$$\delta_{ij} = (V_{yij}^2 + V_{zij}^2)^{\frac{1}{2}} - (2f-1)D_a + \lambda - \lambda_{xi} \qquad \text{Equation 11}$$

In the cross-sectional view taken in the x-axis direction as shown in FIG. 6, in which the portion of the carriage 12 contacts the balls 16 inside the carriage 12, the amount $\delta_{ij}$ of elastic deformation of each of the balls 16 within the crowning-processed areas decreases. It is because the center $A_c'$ of the curvature of the raceway surface of the carriage 12 is apart from the center $A_c$ of curvature of the raceway surface of the rail. This can be considered that the ball diameter is reduced correspondingly. Thus, this amount is denoted by $\lambda_{xi}$ and subtracted in the equation above.

If we use a ball as the rolling body and rely on an equation that represents an amount of elastic approaching derived from the contact theory of Hertz, the rolling body load $P_{ij}$ is obtained from an amount $\delta_{ij}$ of elastic deformation using the following equation.

$$P_{ij} = C_b \delta_{ij}^{\frac{3}{2}} \qquad \text{Equation 12}$$

$C_b$ represents a non-linear spring constant (N/mm$^{3/2}$), and is given by the following equation.

$$Cb = 2^{-\frac{3}{2}}\left(\frac{2K}{\pi\mu}\right)^{-\frac{3}{2}}\left[\frac{1}{8}\left\{\frac{3}{E}\left(1-\frac{1}{m^2}\right)\right\}^2\right]^{-\frac{1}{2}} \qquad \text{Equation 13}$$

where E is the modulus of longitudinal elasticity, 1/m is the Poisson's ratio, and $2K/\pi\mu$ is the Hertz coefficient.

From the foregoing, it can be said that the contact angle, the amount of elastic deformation and the rolling body load are represented by the equations for all of the balls 16 in the carriage 12 by using the five components $\alpha_1$-$\alpha_5$ of the displacement of the carriage 12.

It should be noted that for the sake of easier understanding, the carriage 12 is considered to be a rigid body, and the load distribution theory with the rigid body model is used in the foregoing description. It is possible to extend this load distribution theory with the rigid body model, and apply the beam theory to take the deformations of the sleeves 12-2 of the carriage 12 into account, thereby using the load distribution theory with the carriage beam model. It is also possible to employ the carriage 12 and the rail 11 as the FEM model, thereby using the load distribution theory with the carriage-rail FEM model.

Calculating the Loads (Five Components of the External Force)

Lastly, we use the above-described equations and establish equations for condition-of-equilibrium with regard to the five components of the external force, i.e., the radial load $F_y$, the pitching moment $M_a$, the rolling moment $M_c$, the horizontal load $F_z$, and the yawing moment $M_b$.

For the radial load $F_y$, \hfill Equation 14

$$F_y = \sum_{j=1}^{4}\sum_{i=1}^{I} P_{ij}\sin\beta_{ij}$$

For the pitching moment $M_a$, \hfill Equation 15

$$M_a = \sum_{j=1}^{4}\sum_{i=1}^{I} P_{ij}\sin\beta_{ij}x_{ij}$$

For the rolling moment \hfill Equation 16

$$M_c, M_c = \sum_{j=1}^{4}\sum_{i=1}^{I} P_{ij}\omega_{ij}$$

where $\omega_{ij}$ represents the arm length of the moment, and is given by the following equation. Note that $z_r$ and $y_r$ are the coordinates of the point Ar.

$$\omega_{ij} = z_{rij}\sin\rho_{ij} - y_{rij}\cos\beta_{ij}$$

For the horizontal load $F_z$, \hfill Equation 17

$$F_z = \sum_{j=1}^{4}\sum_{i=1}^{I} P_{ij}\cos\beta_{ij}$$

For the yawing moment $M_b$, \hfill Equation 18

$$M_b = \sum_{j=1}^{4}\sum_{i=1}^{I} P_{ij}co\beta_{ij}x_i$$

From the equations above, it is possible to calculate the loads (five components of the external force) acting on the carriage 12.

Calculating the Service Life

Figure 9:
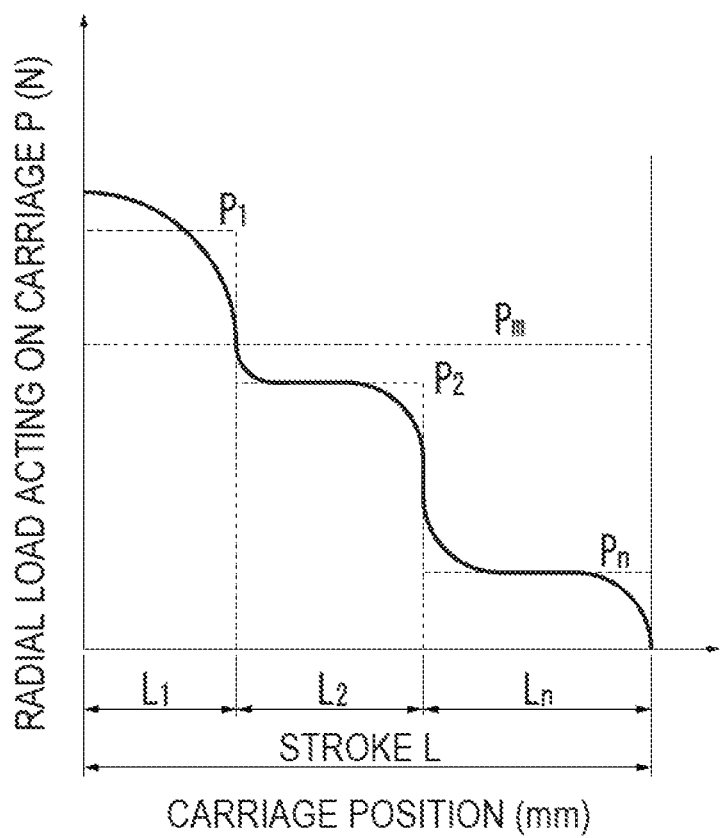
FIG. 9 is a graph that represents the relationship between a position of the carriage and a load acting on the carriage.

Subsequently, the computer 6 calculates the service life of the motion guide device 1 on the basis of the calculated loads on the carriage 12. In the following description, a method of calculating the service life of the motion guide device 1 will be described. The loads on the carriage 12, which are calculated by the computer 6, are associated with the position of the carriage 12. The loads on the carriage 12 are graphed, for example, as shown in FIG. 9, with the horizontal axis representing the position of the carriage 12 and the vertical axis representing the load on the carriage 12. FIG. 9 shows an example in which the radial load on the motion guide device 1 changes to $P_1$, $P_2$ and $P_n$ in one cycle of action pattern of the real machine. The computer 6 calculates the average load on the motion guide device 1 during traveling of the motion guide device on the basis of the changing loads $P_1$, $P_2$ and $P_n$. The average load is calculated, for example, by the following equation.

$$P_m = \sqrt[3]{\frac{1}{L}\cdot\sum_{n=1}^{n}(P_n^3 \cdot L_n)} \qquad \text{Equation 19}$$

where $P_m$ is the average load (N), $P_n$ is the changing load (N), L is a stroke (mm), and $L_n$ is a distance traveled with the load $P_n$. Similarly, the computer 6 calculates the average load on the motion guide device 1 during traveling for the five components of the external force acting on the carriage 12.

Then, the computer 6 calculates an equivalent load, which will be used in calculating the service life, on the basis of the calculated average load. The equation for calculating the equivalent load varies with the model number (type) of the motion guide device 1, and is given by a manufacturer of the motion guide device 1. For example, if the motion guide device 1 is an HSR type (model number of the THK Co., Ltd.), the equivalent load $P_c$ is calculated by the following equation using the average load $P_R$ of the radial load and the average load $P_T$ of the horizontal load.

$$P_c = P_R + P_T \qquad \text{Equation 20:}$$

Subsequently, the computer 6 uses, for example, the following equation to calculate a rating service life L (km). The rating service life is a total traveling distance that is traveled by 90% of individual motion guide devices in a group of same motion guide devices 1 under the same condition without flaking (scale-like exfoliation of the metal surface).

$$L = \left( \frac{f_H \cdot f_T \cdot f_C}{f_W} \cdot \frac{C}{P_C} \right)^3 \times 50 \qquad \text{Equation 21}$$

where L is the rating service life (km), C is the basic dynamic load rating (N), and $P_c$ is the equivalent load (N). Note that $f_H$ is a hardness factor, $f_T$ is a temperature factor, $f_c$ is a contact factor, and $f_w$ is a load factor. Note that $f_H$, $f_T$, $f_c$ and $f_w$ are given by the manufacturer of the motion guide device 1. For example, $f_H = f_T = f_c = f_w = 1$.

The foregoing has described the configuration of the load measuring system for the motion guide device 1 according to the embodiment. The load measuring system for the motion guide device 1 of this embodiment provides the following advantages.

In this embodiment, it is not necessary to clamp a strain gauge between the carriage 12 and the table 8 of the real machine, and it is possible to accurately measure the load (load acting on the motion guide device 1, with the motion guide device 1 being assembled in the real machine, and including a weight of an object disposed on the carriage 12) on the motion guide device 1 in real time while the real machine is being used. Also, the load on the motion guide device 1 is associated with the position of the carriage 12 relative to the rail 11 in the relative movement direction. Thus, it is possible to accurately measure the load on the motion guide device 1 that changes during traveling. As the load on the motion guide device 1 is accurately measured, it is not necessary to select a motion guide device 1 that has an excessive rated load, and it is possible to more precisely predict the service life of the motion guide device 1.

In the load calculation process, the loads and the contact angles of the balls 16 disposed between the rail 11 and the carriage 12 are calculated. Thus, it is possible to accurately calculate the loads.

Because the radial sensors 2*a*, 2*b*, 3*a* and 3*b*, and the horizontal sensors 2*c*, 2*d*, 3*c* and 3*d* are arranged on the sensor mounts 15*a* and 15*b* attached to the opposite ends of the carriage 12 in the moving direction, it is not necessary to redesign or modify the carriage 12 when the radial sensors 2*a*, 2*b*, 3*a* and 3*b*, and the horizontal sensors 2*c*, 2*d*, 3*c* and 3*d* are mounted on the carriage 12. Furthermore, because the distance between the radial sensors 2*a*, 2*b* and the radial sensors 3*a*, 3*b*, and the distance between the horizontal sensors 2*c*, 2*d* and the horizontal sensors 3*c*, 3*d* can be increased in order to see the displacements of the entire rows of balls, it is possible to accurately calculate the moment displacement of the carriage 12.

Because each of the sensor mounts 15*a* and 15*b* has the horizontal portion 15-1 that faces the upper surface 11*c* of the rail 11 and the sleeves 15-2 that face the side surfaces of the rail 11, it is possible to easily arrange the radial sensors 2*a*, 2*b*, 3*a* and 3*b* and the horizontal sensors 2*c*, 2*d*, 3*c* and 3*d* on the sensor mounts 15*a* and 15*b*.

Because the positions of the carriage 12 relative to the rail 11 in the radial direction and the horizontal direction are detected when the carriage 12 is in a no-load condition in which the table 8 of the real machine is removed from the carriage 12, as the references of the displacements of the carriage 12, and then the positions of the carriage 12 relative to the rail 11 in the radial direction and the horizontal direction in the loaded condition in which the table 8 of the real machine is attached to the carriage are detected, it is possible to accurately detect the displacement of the carriage 12 in use, even if the rail 11 bends.

It should be noted that the present invention is not limited to the above-described embodiment. The present invention may be embodied in various forms without changing the gist of the present invention.

Although the five components of the displacement of the carriage are calculated in the above-described embodiment, one, two, three or four components of the displacement of the carriage may be calculated to simplify the calculation if the force or moment acting on the carriage is identified or known. This will decrease the number of sensors and reduce the cost.

Although the rail is arranged on the horizontal plane in the above-described embodiment, the rail may be arranged on a vertical plane, or on an inclined plane.

Although the balls are used as the rolling bodies in the above-described embodiment, rollers may be used as the rolling bodies.

Optional parts such as seals and a lubricant feeding unit may be provided on opposite end faces of the sensor mounts in the carriage moving direction.

The specification is based on Japanese Patent Application No. 2016-010548 filed on Jan. 22, 2016, and the entire disclosure thereof is incorporated herein by reference.

REFERENCE NUMERALS AND SYMBOLS

1: Motion guide device, 2*a*, 2*b*, 3*a*, 3*b*: Radial sensors (sensors), 2*c*, 2*d*, 3*c*, 3*d*: Horizontal sensors (sensors), 4: Linear encoder (position detecting unit), 5: Data logger (recorder), 6: Computer (calculating unit), 11: Rail (track member), 12: Carriage (sliding member), 15*a*, 15*b*: Sensor mounts, 15-1: Horizontal portion, 15-2: Sleeve, 16: Ball (rolling body)

The invention claimed is:

1. A load measuring system for a motion guide device, the motion guide device having a sliding member that is assembled on a track member via rolling bodies such that the sliding member can move relative to the track member, the load measuring system comprising: a position detecting unit configured to detect a position of the sliding member relative to the track member in a relative movement direction; at least one sensor configured to detect a displacement of the sliding member relative to the track member; and a calculating unit configured to calculate a load acting on the motion guide device associated with the position, based on position information detected by the position detecting unit and displacement information detected by said at least one sensor, wherein the calculating unit configured to calculate each of a radial load, a pitching moment, a rolling moment, a horizontal bad and a yawing moment which are five components of an external force of the motion guide device, using all of a radial displacement, a pitching angle, a rolling angle, a horizontal displacement and a yawing angle which are five components of displacement of the sliding member.

2. The load measuring system for a motion guide device according to claim 1, wherein said at least one sensor is configured to detect, as a reference of the displacement, the position of the sliding member relative to the track member in a no-load condition in which a movable portion of a real machine is removed from the sliding member, and then detect the position of the sliding member relative to the track member in a loaded condition in which the movable portion of the real machine is attached to the sliding member.

3. A bad measuring system for a motion guide device, the motion guide device having a sliding member that is assembled on a track member via rolling bodies such that the sliding member can move relative to the track member, the bad measuring system comprising: a position detecting unit configured to detect a position of the sliding member relative to the track member in a relative movement direction; at least one sensor configured to detect a displacement of the sliding member relative to the track member; and a calculating unit configured to calculate a bad acting on the motion guide device associated with the position, based on position information detected by the position detecting unit and displacement information detected by said at least one sensor, wherein the calculating unit configured to calculate loads and contact angles of the rolling bodies disposed between the track member and the sliding member in calculating the bad acting on the motion guide device associated with the position.

4. The load measuring system for a motion guide device according to claim 3, wherein said at least one sensor includes a radial sensor configured to detect a gap between an upper surface of the track member and the radial sensor in a radial direction and/or a horizontal sensor configured to detect a gap between a side surface of the track member and the horizontal sensor in a horizontal direction, and the radial sensor and/or the horizontal sensor is arranged on each of sensor mounts attached to both ends of the sliding member in said relative movement direction.

5. The load measuring system for a motion guide device according to claim 4, wherein each of the sensor mounts has a horizontal portion that faces the upper surface of the track member and a sleeve that faces the side surface of the track member, the radial sensor is arranged on the horizontal portion of each said sensor mount, and the horizontal sensor is arranged on the sleeve of each said sensor mount.

6. The load measuring system for a motion guide device according to claim 2, wherein said at least one sensor is configured to detect, as a reference of the displacement, the position of the sliding member relative to the track member in a no-load condition in which a movable portion of a real machine is removed from the sliding member, and then detect the position of the sliding member relative to the track member in a loaded condition in which the movable portion of the real machine is attached to the sliding member.

7. The load measuring system for a motion guide device according to claim 4, wherein said at least one sensor is configured to detect, as a reference of the displacement, the position of the sliding member relative to the track member in a no-load condition in which a movable portion of a real machine is removed from the sliding member, and then detect the position of the sliding member relative to the track member in a loaded condition in which the movable portion of the real machine is attached to the sliding member.

8. The load measuring system for a motion guide device according to claim 5, wherein said at least one sensor is configured to detect, as a reference of the displacement, the position of the sliding member relative to the track member in a no-load condition in which a movable portion of a real machine is removed from the sliding member, and then detect the position of the sliding member relative to the track member in a loaded condition in which the movable portion of the real machine is attached to the sliding member.

9. A method of measuring a load on a motion guide device that has a sliding member assembled on a track member via rolling bodies such that the sliding member can move relative to the track member, the method comprising the steps of:

detecting a position of the sliding member relative to the track member in a relative movement direction;

detecting a displacement of the sliding member relative to the track member; and calculating the load on the motion guide device associated with the position, based on detected position information and detected displacement information, wherein, in the step of calculating the load on the motion guide device, each of a radial load, a pitching moment, a rolling moment, a horizontal load and a yawing moment which are five components of an external force of the motion guide device are calculated, using all of a radial displacement, a pitching angle, a rolling angle, a horizontal displacement and a yawing angle which are five components of displacement of the sliding member.

10. A method of calculating a service life of a motion guide device, comprising:

calculating an average load on the motion guide device in an action pattern of a real machine, based on the load on the motion guide device, which is calculated by using the method of measuring a load according to claim 9; and calculating a service life of the motion guide device, based on the average load.

* * * * *

UNITED STATES PATENT AND TRADEMARK OFFICE
CERTIFICATE OF CORRECTION

PATENT NO. : 10,920,825 B2
APPLICATION NO. : 16/066114
DATED : February 16, 2021
INVENTOR(S) : Yusuke Asano et al.

It is certified that error appears in the above-identified patent and that said Letters Patent is hereby corrected as shown below:

In the Specification

Change
Column 10, Line 25:
$\delta_{yij} = \alpha_1 + \alpha_2 x_i + \alpha_3 z_{cij}$
$\delta_{zij} = \alpha_4 + \alpha_5 x_i - \alpha_3 u_{cij}$      Equation 7:
To be:
Equation 7:
$\delta_{yij} = \alpha_1 + \alpha_2 x_i + \alpha_3 z_{cij}$
$\delta_{zij} = \alpha_4 + \alpha_5 x_i - \alpha_3 y_{cij}$ Change
Column 12, Line 9:
For the rolling moment      Equation 16

$$M_c, \ M_c = \sum_{j=1}^{4} \sum_{i=1}^{l} P_{ij} \omega_{ij}$$

To be:
Equation 16:
For the rolling moment $M_c$, $$M_c = \sum_{j=1}^{4} \sum_{i=1}^{l} P_{ij} \omega_{ij}$$

Change
Column 12, Line 16:
$\omega_{ij} = z_{rij} \sin \rho_{ij} - y_{rij} \cos \beta_{ij}$ To be:

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,920,825 B2

$\omega_{ij} = z_{rij} \sin \beta_{ij} - y_{rij} \cos \beta_{ij}$

In the Claims

Change
Column 15, Line 2:
a horizontal bad and a yawing moment which are five
To be:
a horizontal load and a yawing moment which are five Change
Column 15, Line 17:
3. A bad measuring system for a motion guide device, the
To be:
3. A load measuring system for a motion guide device, the Change
Column 15, Line 21:
bad measuring system comprising; a position detecting unit
To be:
load measuring system comprising; a position detecting unit Change
Column 15, Line 26:
lating unit configured to calculate a bad acting on the motion
To be:
lating unit configured to calculate a load acting on the motion Change
Column 15, Line 33:
calculating the bad acting on the motion guide device
To be:
calculating the load acting on the motion guide device